United States Patent
Azumi et al.

(10) Patent No.: US 9,001,078 B2
(45) Date of Patent: Apr. 7, 2015

(54) INPUT DEVICE AND DISPLAY DEVICE WITH INPUT DEVICE

(71) Applicant: Japan Display Inc., Tokyo (JP)

(72) Inventors: Kohei Azumi, Tokyo (JP); Hayato Kurasawa, Tokyo (JP); Koji Ishizaki, Tokyo (JP)

(73) Assignee: Japan Display Inc., Tokyo (JP)

( * ) Notice: Subject to any disclaimer, the term of this patent is extended or adjusted under 35 U.S.C. 154(b) by 84 days.

(21) Appl. No.: 13/946,760

(22) Filed: Jul. 19, 2013

(65) Prior Publication Data

US 2014/0035867 A1    Feb. 6, 2014

(30) Foreign Application Priority Data

Aug. 1, 2012    (JP) .................................. 2012-170808

(51) Int. Cl.
*G06F 3/044* (2006.01)
*G06F 3/041* (2006.01)

(52) U.S. Cl.
CPC .............. *G06F 3/044* (2013.01); *G06F 3/0412* (2013.01)

(58) Field of Classification Search
CPC ......... G06F 3/041; G06F 3/044; G06F 3/045; G06F 3/0412; G06F 3/046; G06F 3/0416; G06F 2203/04111; G06F 2203/04112; G06F 2203/04113

USPC .................................. 345/156–179; 178/18.01
See application file for complete search history.

(56) References Cited

U.S. PATENT DOCUMENTS

| | | | |
|---|---|---|---|
| 6,445,426 B1 * | 9/2002 | Kang et al. ....................... | 349/12 |
| 2009/0201267 A1 * | 8/2009 | Akimoto et al. ............... | 345/173 |
| 2010/0045632 A1 * | 2/2010 | Yilmaz et al. .................. | 345/174 |
| 2010/0182273 A1 | 7/2010 | Noguchi et al. | |

FOREIGN PATENT DOCUMENTS

JP    2009-244958    10/2009

* cited by examiner

*Primary Examiner* — Kevin M Nguyen
*Assistant Examiner* — Mansour M Said
(74) *Attorney, Agent, or Firm* — K&L Gates LLP (57) ABSTRACT

When an ideal value of a width of each of a plurality of detecting electrodes (input-position detecting electrodes) in an X direction provided in an input device is defined as Wsmax [μm], an interval which is a center-to-center distance of adjacent detecting electrodes is defined as P [μm], and an effective inter-electrode distance represented by an inverse number of a value obtained by dividing a relative permittivity of an intermediate member by a thickness of the intermediate member is defined as D [μm], Wsmax is represented by a formula of: Wsmax=0.488×P-4.33×D-160. Also, a width of each of the plurality of detecting electrodes in the X direction falls within a range of not more than ±150 μm of a value of the Wsmax.

5 Claims, 9 Drawing Sheets

| INTERVAL P [μm] | EFFECTIVE INTER-ELECTRODE DISTANCE D [μm] | ELECTRODE WIDTH (IDEAL VALUE) Wsmax [μm] | ELECTRODE WIDTH WX [μm] | WX−Wsmax [μm] | DETECTION ERROR [mm] | EVALUATION |
|---|---|---|---|---|---|---|
| 2400 | 60 | 751 | 500 | −251 | ±3.3 | × |
| | | | 550 | −201 | ±2.7 | × |
| | | | 600 | −151 | ±1.9 | △ |
| | | | 650 | −101 | ±1.2 | ○ |
| | | | 700 | −51 | ±0.7 | ○ |
| | | | 750 | −1 | ±0.5 | ○ |
| | | | 800 | 49 | ±0.7 | ○ |
| | | | 850 | 99 | ±1.2 | ○ |
| | | | 900 | 149 | ±1.9 | △ |
| | | | 950 | 199 | ±2.7 | × |
| | | | 1000 | 249 | ±3.3 | × |
| 2000 | 120 | 296 | 100 | −196 | ±2.5 | × |
| | | | 150 | −146 | ±1.8 | △ |
| | | | 200 | −96 | ±1.1 | ○ |
| | | | 250 | −46 | ±0.6 | ○ |
| | | | 300 | 4 | ±0.5 | ○ |
| | | | 350 | 54 | ±0.8 | ○ |
| | | | 400 | 104 | ±1.3 | ○ |
| | | | 450 | 154 | ±2.1 | × |
| | | | 500 | 204 | ±2.8 | × |

INPUT DEVICE AND DISPLAY DEVICE WITH INPUT DEVICE

CROSS REFERENCES TO RELATED APPLICATIONS

The present application claims priority to Japanese Priority Patent Application JP 2012-170808 filed in the Japan Patent Office on Aug. 1, 2012, the entire content of which is hereby incorporated by reference.

BACKGROUND

The present invention relates to a display device with an input device and a manufacturing technology thereof, and in particular relates to a display device with an input device using a capacitive sensing method and a manufacturing technology thereof.

There is a technology of an input device called a touch panel (touch sensor) in which data is inputted to an electronic device by touching a display screen with a finger. Also, there is an input device using a capacitive sensing method in which an input position on a display screen is detected based on an electrostatic capacitance of capacitive elements arranged on the display screen. In addition, there is a technology for reducing the thickness of a touch-panel display device by forming some of electrodes for detecting a contact position of a touch panel and some of display electrodes of a display device as common electrodes (for example, Japanese Patent Application Laid-Open Publication No. 2009-244958 (Patent Document 1)).

SUMMARY

The inventors of the present application have studied the performance improvement of an input device and a display device with an input device in which data is input to an electronic device by making an input tool such as a finger in contact with or bringing it close to a display screen, and have found out the following problems.

That is, in an input device using a capacitive sensing method, a plurality of capacitive elements are arranged on a display screen, and an input position is specified by detecting a change of the electrostatic capacitance of each capacitive element or a value of the electrostatic capacitance thereof. Consequently, a position detection accuracy (accuracy of input position detection) of an input device varies largely depending on the width and arrangement interval of electrodes for input position detection. In addition, when the arrangement interval of electrodes for input position detection is narrowed, a resolution of an input position detection element is increased, but a detection sensitivity thereof is decreased. On the other hand, when the arrangement interval of electrodes for input position detection is widened, the detection sensitivity is enhanced, but the resolution is decreased because the number of input position detection elements per unit area is decreased.

As mentioned above, the detection sensitivity of an input position and the resolution are in a relation of trade-off. In addition, since the detection sensitivity and resolution vary also depending on an electrostatic capacitance of capacitive elements formed between the electrodes for input position detection, the optimum values of the width and arrangement interval of electrodes for input position detection differ for each product. In recent years in particular, various kinds of members are disposed between electrodes for input position detection in order to improve the performance of an input device or a display device with an input device, and it is difficult to calculate the optimum value of the width and arrangement interval of the electrodes.

The present invention has been made in view of the above-described problems, and an object thereof is to provide a technology capable of improving an input position detection sensitivity and resolution of an input device.

An input device according to the present invention is provided with: a plurality of input-position detecting electrodes arranged at a first interval along a first direction of a display plane; at least one driving electrode which is arranged so as to be opposed to the plurality of input-position detecting electrodes and forms an electrostatic capacitance with the plurality of input-position detecting electrodes; and an intermediate member disposed between the plurality of input-position detecting electrodes and the at least one driving electrode. Also, when an ideal value of a width of each of the plurality of input-position detecting electrodes in the first direction is defined as Wsmax [μm], the first interval which is a center-to-center distance of adjacent input-position detecting electrodes among the plurality of input-position detecting electrodes is defined as P [μm], and an effective inter-electrode distance represented by an inverse number of a value obtained by dividing a relative permittivity of the intermediate member by a thickness of the intermediate member is defined as D [μm], Wsmax is represented by a following formula: Wsmax=0.488×P−4.33×D−160. Further, the width of each of the plurality of input-position detecting electrodes in the first direction falls within a range of not more than ±150 μm of a value of the Wsmax.

In the above-mentioned display device with an input device according to the present invention, when an effective inter-electrode distance between an input-position detecting electrode and a driving electrode and an arrangement pitch of the input-position detecting electrodes are determined, it is possible to easily calculate the optimal width of the input-position detecting electrode. Consequently, an input position detection sensitivity and resolution of various types of input devices can be respectively enhanced.

Additional features and advantages are described herein, and will be apparent from the following Detailed Description and the figures.

DETAILED DESCRIPTION

Hereinafter, embodiments of the present invention will be described in detail with reference to the accompanying drawings. Components having the same or similar function are denoted by the same reference symbols throughout the drawings for describing the embodiments, and the repetitive description thereof will be omitted in principle.

Note that, although FIGS. 5, 8, 10, 11 and 12 described in the following embodiments are cross-sectional views, hatching is omitted in principle for making the drawings easy to see. In addition, in each sectional view, a liquid crystal LC constituting a liquid crystal layer 16 is schematically shown as an elliptical shape. Also, although a plurality of the same members are provided in some cases in each of the sectional views mentioned above, a symbol is given to one of the plurality of members for making the drawings easy to see, and common hatching is given to the same members for identification.

First Embodiment

<Capacitive-Type Input Device>

Figure 1:
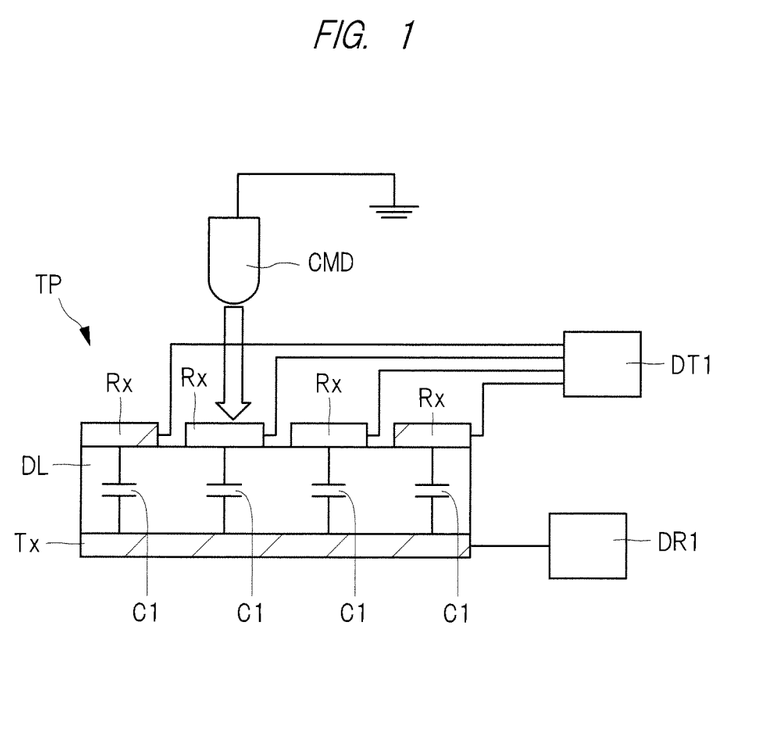
FIG. 1 is an explanatory diagram of a schematic configuration of a capacitive-type touch panel (input device)
Figure 2:
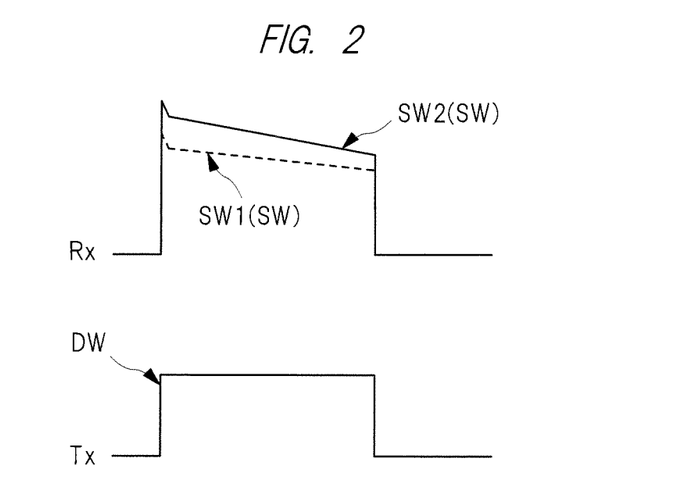
FIG. 2 is an explanatory diagram showing an example of a relation between a driving waveform applied to the touch panel shown in FIG. 1 and a signal waveform outputted from the touch panel.
Figure 3:
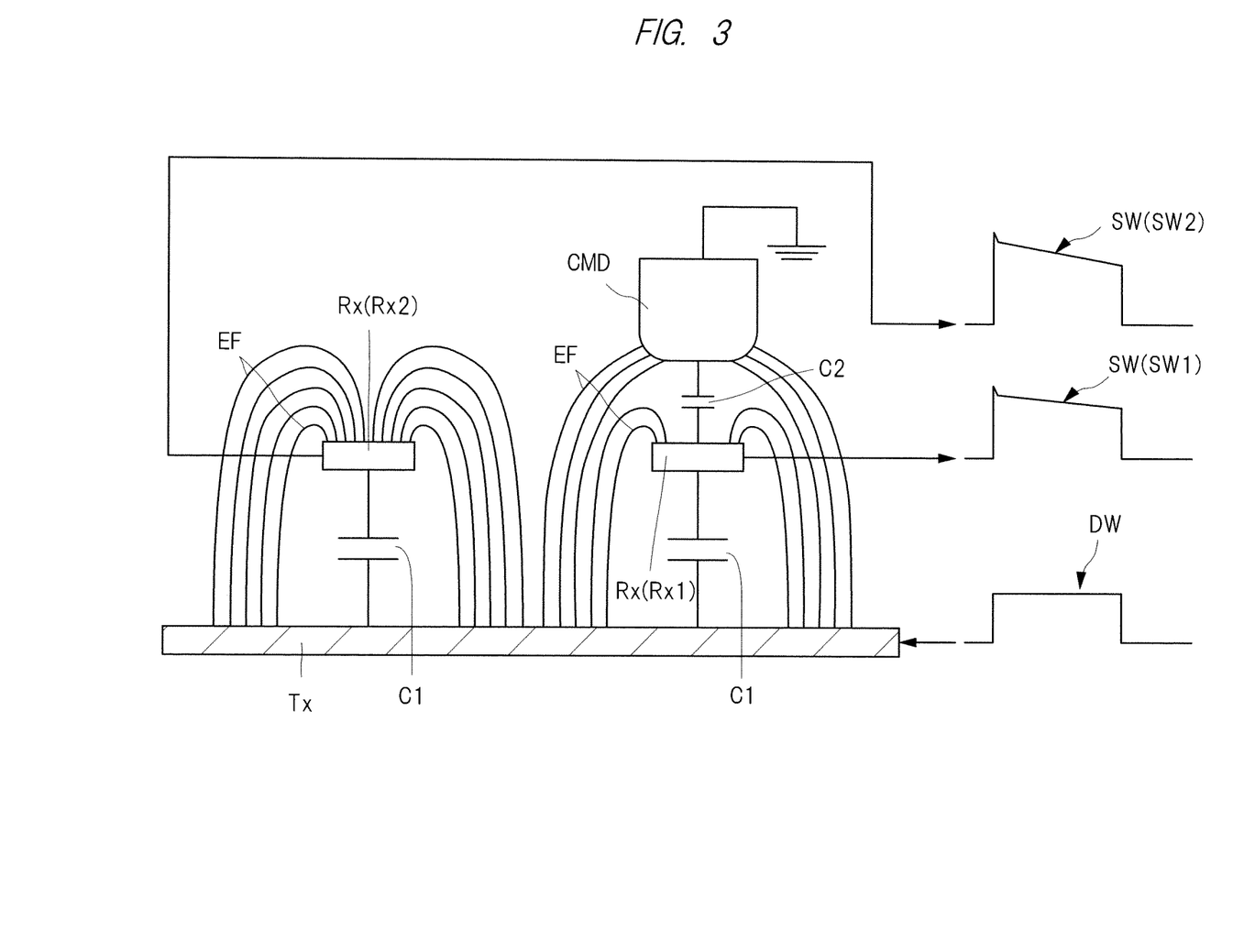
FIG. 3 is an explanatory diagram schematically showing an example of an arrangement of the driving electrodes and detecting electrodes shown in FIG. 1.
Figure 4:
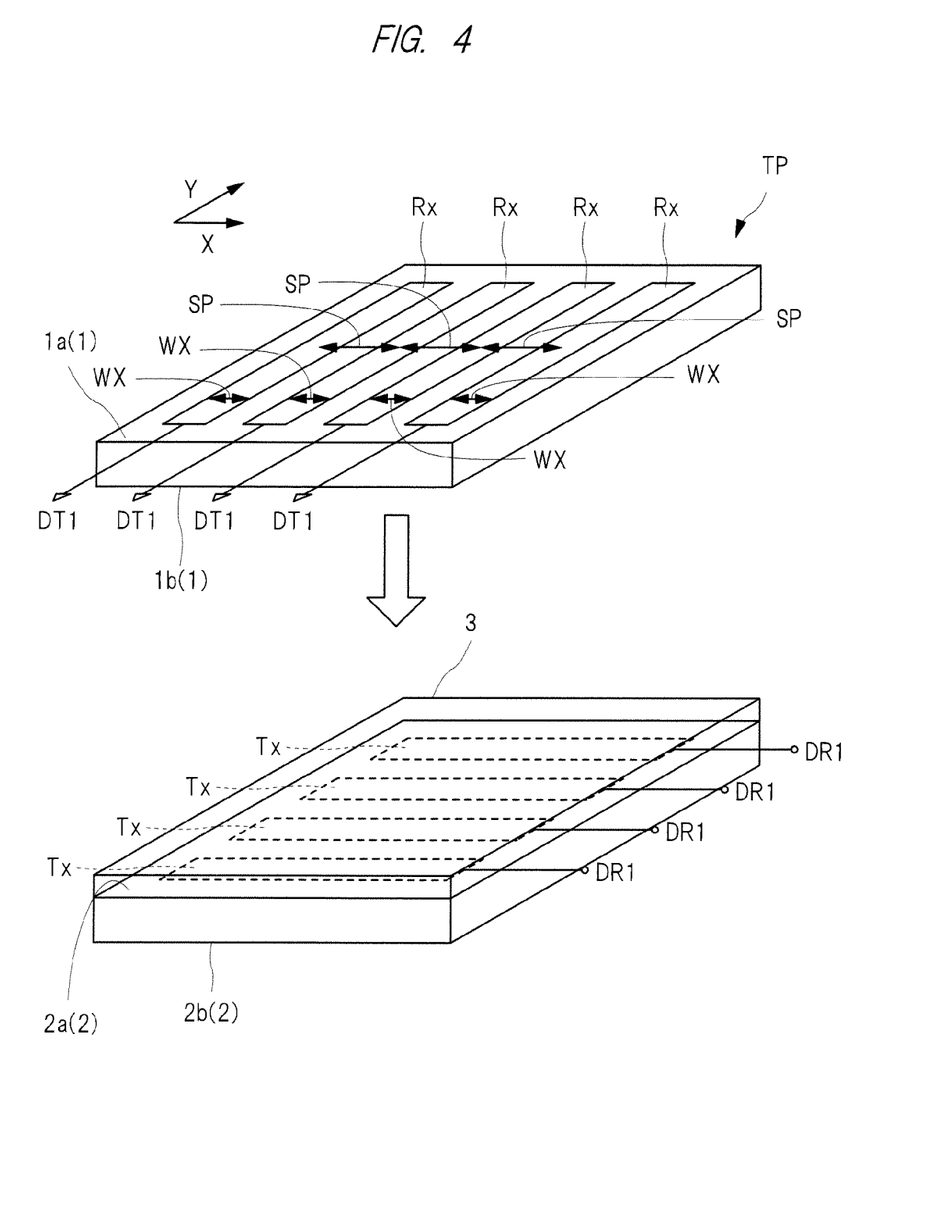
FIG. 4 is an explanatory diagram schematically showing an example of an arrangement of the driving electrodes and detecting electrodes shown in FIG. 1.
Figure 5:
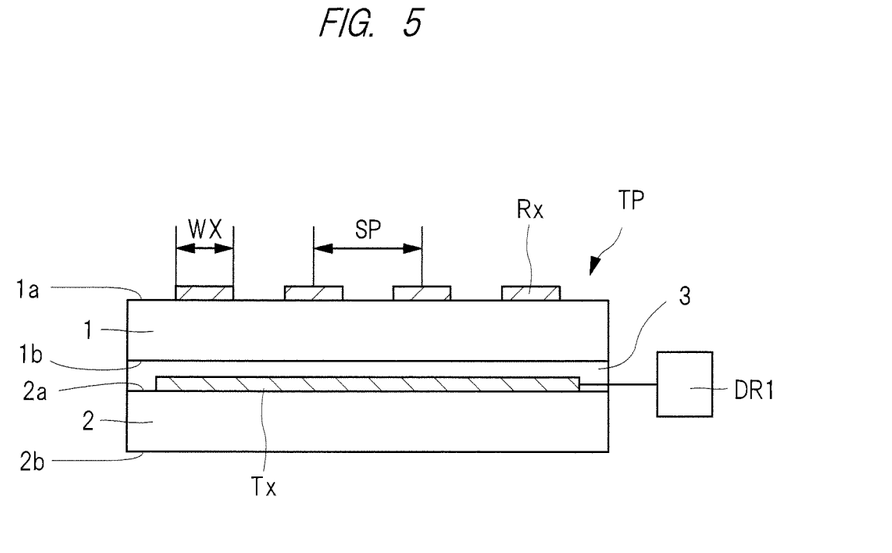
FIG. 5 is a cross-sectional view taken along an X direction shown in FIG. 4.

First, a basic operation principle of an input device which is called a capacitive-type touch panel (or touch sensor) will be described. FIG. 1 is an explanatory diagram of a schematic configuration of a capacitive-type touch panel (input device). Also, FIG. 2 is an explanatory diagram showing an example of a relation between a driving waveform applied to the touch panel shown in FIG. 1 and a signal waveform outputted from the touch panel. In addition, FIG. 3 is an explanatory diagram schematically showing an electric field status around a detecting electrode at the time of detecting an input position in the touch panel shown in FIG. 1. Further, FIG. 4 is an explanatory diagram schematically showing an example of an arrangement of the driving electrodes and detecting electrodes shown in FIG. 1. Furthermore, FIG. 5 is a cross-sectional view taken along the X direction shown in FIG. 4.

As shown in FIG. 1, the capacitive-type touch panel (input device) TP is provided with a plurality of capacitive elements C1 each constituted of a dielectric layer (intermediate member) DL and a pair of electrodes arranged to be opposed to each other via the dielectric layer DL. To a driving electrode Tx which constitutes one of the paired electrodes, a driving waveform DW which is, for example, a square wave as shown in FIG. 2 is applied from a drive circuit DR1 for input device. On the other hand, from the detecting electrode (input-position detecting electrode) Rx which constitutes the other of the paired electrodes, for example, a current in accordance with the driving waveform DW and an electrostatic capacitance of the capacitive element C1 shown in FIG. 1 flows as shown in FIG. 2, and a signal waveform SW is outputted. The signal waveform SW outputted from the detecting electrode Rx is outputted to a detection circuit DT1 (see FIG. 1) which detects an input position.

Here, as shown in FIG. 3, an input tool CMD such as a finger or a touch pen which is a capacitive element (dielectric substance) whose one end is connected to a ground potential is brought close to or made contact with one of a plurality of detecting electrodes Rx (detecting electrode Rx1) of the input device TP. At this time, at a detecting electrode Rx2 located at a position apart from the input tool CMD, an electrical field represented by a plurality of electric force lines EF connecting between the driving electrode Tx and the detecting electrode Rx2 is generated.

On the other hand, at the detecting electrode Rx1 located at a position near the input tool CMD, a capacitance C2 of the input tool CMD is added to the capacitive element C1. In this case, as shown in FIG. 3, since some of the electric force lines EF come to connect between the driving electrode Tx and the input tool CMD, the number of electric force lines EF connected to the detecting electrode Rx1 becomes smaller than the number of electric force lines EF connected to the detecting electrode Rx2. Consequently, at the detecting electrode Rx1 arranged at a position near the input tool CMD, a signal waveform SW1 smaller than a signal waveform SW2 outputted at the detecting electrode Rx2 arranged at another position is outputted.

Therefore, in the detection circuit DT1 shown in FIG. 1, by monitoring signal waveforms SW transmitted from each of a plurality of detecting electrodes Rx, a position of the input tool CMD can be specified based on a value of the signal waveform SW or a variation amount of the signal waveform SW. For example, the position of the input tool CMD can be outputted by setting a threshold value of the variation amount of the signal waveform SW in advance and referencing the positional data of the detecting electrode Rx at which the variation amount exceeds the threshold value. For example, it is also possible to directly compare a value of the signal waveform SW with the threshold value. In addition, there are various kinds of methods as a method of monitoring the variation amount of the signal waveform SW, and a method in which a voltage value generated at the detecting electrode Rx is measured or a method in which an integrated quantity of a current value per unit time which flows in the detection circuit DT1 is measured can be used.

Note that a phenomenon in which the capacitance of the input tool CMD is added to the capacitive element C1 occurs not only when the input tool CMD is made contact with the detecting electrode Rx, but also when the input tool CMD comes close to the detecting electrode Rx. Therefore, it is not always essential to expose the detecting electrode Rx on the surface where the input tool CMD is placed, and it is possible to protect the detecting electrode Rx by disposing a covering member between the detecting electrode Rx and the input tool CMD.

In addition, a planar arrangement of each of the driving electrodes Tx and the detecting electrodes Rx is configured as shown in FIG. 4. More specifically, in FIG. 4, when a display plane is defined as an XY plane, a plurality of detecting electrodes Rx provided in the input device TP are regularly arranged at an interval (array interval, arrangement interval) SP along an X direction. Also, each of the plurality of detecting electrodes Rx has a width WX along the X direction, and is formed in a belt-like shape so as to extend in a Y direction perpendicular to the X direction. The interval SP is specified as a center-to-center distance of adjacent detecting electrodes Rx.

On the other hand, in an example shown in FIG. 4, the input device TP is provided with a plurality of driving electrodes Tx. The plurality of driving electrodes Tx are arranged along a Y direction so as to intersect with the detecting electrodes Rx. Also, each of the plurality of driving electrodes Tx is formed in a belt-like shape so as to extend along an X direction. By arranging the plurality of driving electrodes Tx and the plurality of detecting electrodes Rx so as to intersect with each other in this manner, the presence of the input tool CMD (see FIG. 1) can be determined at each intersecting point of the driving electrodes Tx and the detecting electrodes Rx. For example, the driving waveform DW (see FIG. 2) is sequentially applied to the plurality of driving electrodes Tx, and a value or variation amount of the signal waveform SW (see FIG. 2) is determined at each intersecting point of the driving electrodes Tx and the detecting electrodes Rx in a planar view.

In addition, in an example shown in FIG. 4, the plurality of detecting electrodes Rx are formed on a front surface 1a of a substrate 1 having the front surface (side) 1a and a back surface (side, rear surface) 1b located on an opposite side of the front surface 1a. Also, the plurality of driving electrodes Tx are formed on a front surface 2a of a substrate 2 having the front surface (side) 2a and a back surface (side, rear surface) 2b located on an opposite side of the front surface 2a. Then, the substrate 1 on which the plurality of detecting electrodes Rx are formed is disposed to be opposed to the substrate 2 on which the plurality of driving electrodes Tx are formed, and is then fixed thereto via an adhesion layer 3.

In other words, in the example shown in FIGS. 4 and 5, as an intermediate member disposed between the plurality of detecting electrodes Rx and driving electrodes Tx, the substrate 1 and the adhesion layer 3 are present. An electrostatic capacitance of the capacitive element C1 (see FIG. 1) formed between the detecting electrode Rx and the driving electrode Tx is specified based on a distance between the detecting electrode Rx and the driving electrode Tx, an area of the detecting electrode Rx and a relative permittivity of the intermediate member. Therefore, in the case of the input device TP shown in FIGS. 4 and 5, the relative permittivities of the substrate 1 and adhesion layer 3 affect the electrostatic capacitance of the capacitive element C1.

<Input Position Detection Accuracy>

Figure 6:
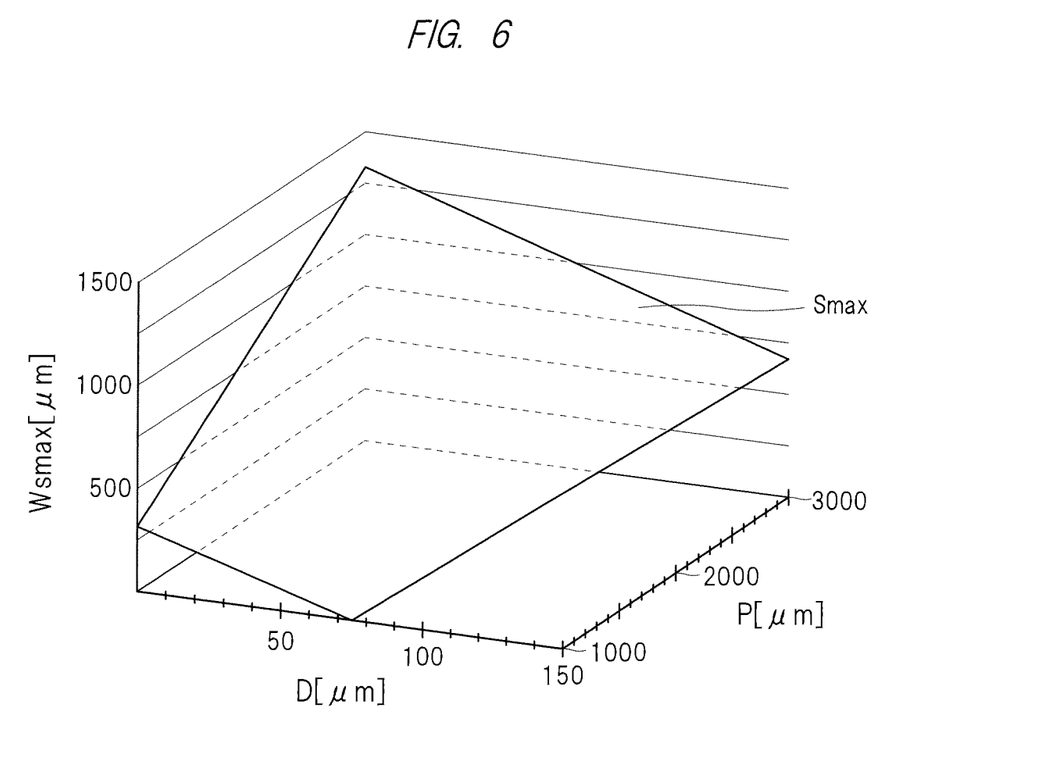
FIG. 6 is an explanatory diagram showing a coordinate plane for calculating an optimum value (ideal value) of a width of an input-position detecting electrode with respect to a position detection accuracy of an input device.

Next, a position detection accuracy (accuracy of input position detection) of the input device TP will be described. FIG. 6 is an explanatory diagram showing a coordinate plane for calculating an optimum value (ideal value) of a width of the input-position detecting electrode with respect to a position detection accuracy of the input device.

Factors to specify the accuracy of the input position detection of the input device TP include a resolution (fineness of the detection point) and a detection sensitivity (fewness of false detection or no detection). If the resolution and the detection sensitivity are both increased, the accuracy of the input position detection is enhanced. This input position accuracy can be represented by an index referred to as a position detection error (Accuracy error). This index of the position detection error represents an error between an actual input position and a detected input position by a distance, and it is generally supposed that the position detection error is preferably not more than ±2.0 mm in a touch panel of a small size to a medium size.

The above-mentioned resolution and detection sensitivity largely vary depending on the width WX and interval SP of the plurality of detecting electrodes Rx. First, as the detection points per unit area are increased more, the resolution is enhanced more. Consequently, from a viewpoint of enhancing the resolution, it is preferred that the interval SP of the plurality of detecting electrodes Rx shown in FIGS. 4 and 5 is narrowed so as to increase the number of the detection points. On the other hand, in the input device TP, as mentioned above, the input position is detected by measuring the value of the signal waveform SW or the variation amount of the signal waveform SW shown in FIGS. 2 and 3. Consequently, if the signal waveform SW becomes large, a frequency of false detection and no detection is decreased, and the detection sensitivity is enhanced. Therefore, it is preferred that the interval SP of the plurality of detecting electrodes Rx shown in FIGS. 4 and 5 is widened (widen a space between adjacent detecting electrodes Rx) so as to make electric force lines EF (see FIG. 3) easily pass between adjacent detecting electrodes Rx.

More specifically, the resolution and the detection sensitivity which are the factors to specify the accuracy of the input position detection largely vary depending on the interval SP of the detecting electrodes Rx, and are in a relation of trade-off. In addition, the value of the width WX of the detecting electrode Rx has an optimum value in accordance with a value of the interval SP. Here, the interval SP of the detecting electrodes Rx is determined in accordance with the input tool CMD that is an object to be detected. For example, the interval SP has a value of about 2 mm to 6 mm in general. Consequently, it has been found out that in order to make a position detection error fall within a range of not more than ±2.0 mm, it is necessary to adjust the width WX of the detecting electrode Rx to an appropriate value. However, since the detection sensitivity is affected also by the thickness and the relative permittivity of the intermediate member disposed between the detecting electrode Rx and the driving electrode Tx, an optimum value (ideal value) of the width WX of the detecting electrode Rx differs for every product type, and the adjustment is difficult.

Then, the inventors of the present application have studied the technology for easily calculating the optimum value (ideal value) of the width WX of the detecting electrode Rx. As a result, it has been found out that if the interval SP of the detecting electrodes Rx is determined, the optimum value of the width WX of the detecting electrode Rx can be represented as a function of an effective inter-electrode distance (an inverse number of a value obtained by dividing a relative permittivity of an intermediate member (substrate 1 and adhesion layer 3 in the case of FIG. 4) by a thickness of the intermediate member). Also, it has been found out that if the above-mentioned effective inter-electrode distance is determined, the optimum value of the width WX of the detecting electrode Rx can be represented as a function of the interval SP of the detecting electrodes Rx. Then, by combining the function formula of the effective inter-electrode distance and the function formula of the interval SP, the following formula has been found out.

That is, an ideal value of the width of each of the plurality of detecting electrodes Rx shown in FIG. 4 in an X direction is defined as Wsmax [μm]. Also, the interval SP that is a center-to-center distance of adjacent detecting electrodes Rx among the plurality of detecting electrodes Rx is defined as P [μm]. In addition, an effective inter-electrode distance represented by an inverse number of a value obtained by dividing a relative permittivity of an intermediate member (substrate 1 and adhesion layer 3 in the case of FIG. 4) by a thickness of the intermediate member is defined as D [μm]. At this time, it has been found out that the following Formula 1 holds:

$$Ws\max = 0.488 \times P - 4.33 \times D - 160 \quad \text{(Formula 1)}$$

The Formula 1 above is a function formula of a coordinate plane Smax shown in FIG. 6, and represents that the values of the width WX, the interval SP, and the effective inter-electrode distance between the detecting electrode Rx and the driving electrode Tx shown in FIG. 4 are optimized when plotted on the coordinate plane Smax shown in FIG. 6. In other words, if values of two variables among three variables of the width WX, the interval SP, and the effective inter-electrode distance between the detecting electrode Rx and the driving electrode Tx shown in FIG. 4 are determined, an optimum value of the remaining one variable can be easily derived by the Formula 1.

In addition, when a plurality of intermediate members are provided between the detecting electrode Rx and the driving electrode Tx as shown in FIGS. 4 and 5, the value of the effective inter-electrode distance in the Formula 1 above is calculated in the following manner. That is, when a relative permittivity of the substrate 1 shown in FIG. 5 is defined as $\epsilon_1$, a thickness of the substrate 1 is defined as $d_1$, a relative permittivity of the adhesion layer 3 is defined as $\epsilon_3$, and a thickness of the adhesion layer 3 is defined as $d_3$, the value of the effective inter-electrode distance is represented by the following Formula 2:

$$D = 1/(\epsilon_1/d_1 + \epsilon_3/d_3) \quad \text{(Formula 2)}$$

In addition, when the Formula 2 above is generalized as a formula in the case where n layers of intermediate members are disposed, the value of the effective inter-electrode distance is represented by the following formula 3:

[Equation 1]

$$D = \frac{1}{\sum_{i=1}^{n} \frac{\epsilon_i}{d_i}} \quad \text{(Formula 3)}$$

In other words, the value is represented as an inverse number of the sum of values obtained by dividing respective relative permittivities of plural layers of the intermediate members by the thicknesses thereof.

More specifically, according to the present embodiment, for example, even in the case of an input device having a complicated structure in which a number of intermediate members are provided between the detecting electrode Rx and the driving electrode Tx, a value of the effective inter-electrode distance to be substituted into the Formula 1 above can be easily calculated when the thickness and relative permittivity of each intermediate member are acquired.

As described above, according to the present embodiment, if values of two variables among three variables of the width WX, the interval SP, and the effective inter-electrode distance between the detecting electrode Rx and the driving electrode Tx are determined, an optimum value of the remaining one variable can be easily derived by the Formula 1. Consequently, an optimal relation among the width WX, the interval SP, and the effective inter-electrode distance between the detecting electrode Rx and the driving electrode Tx can be easily designed for various products different in size and structure.

<Allowable Range of Actual Product>

Figure 7:
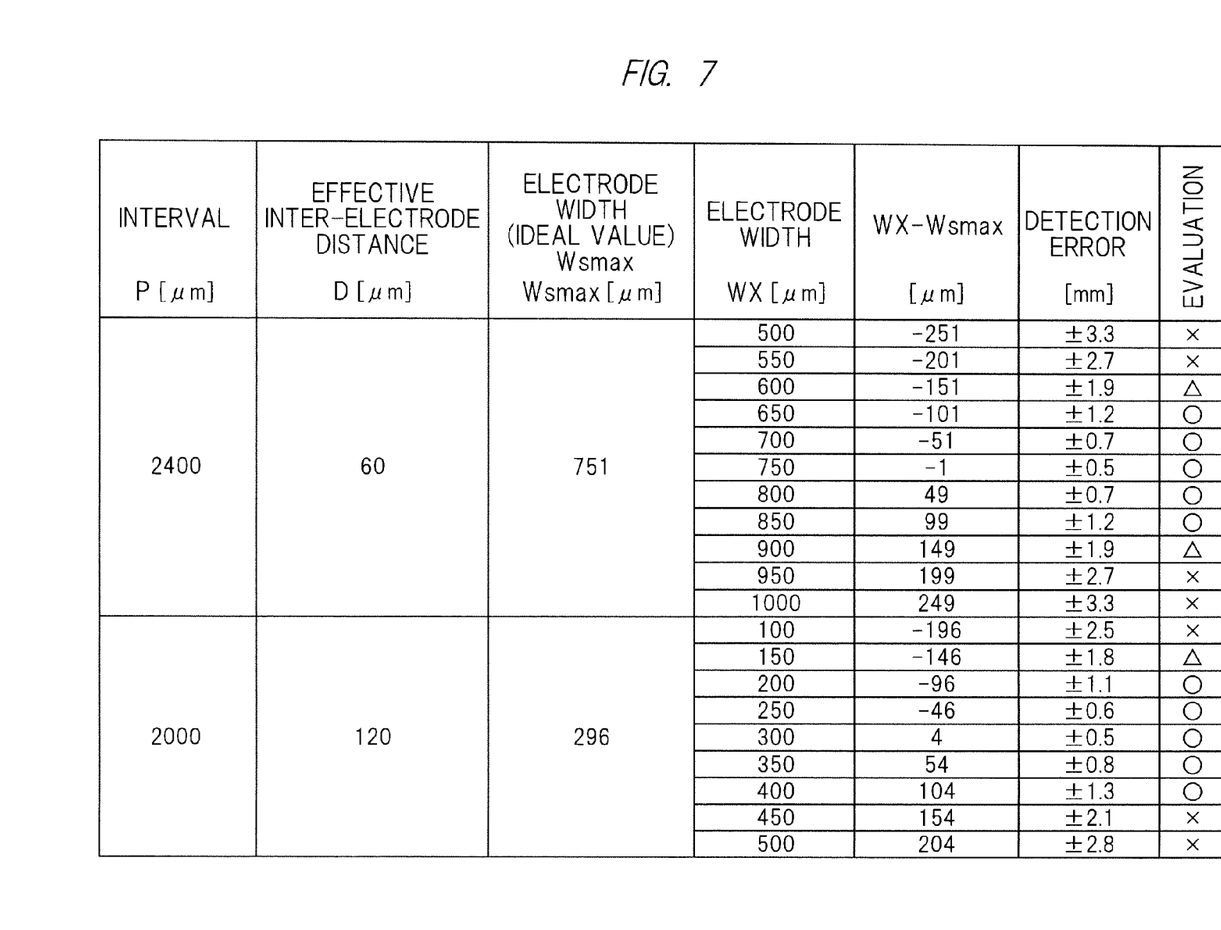
FIG. 7 is an explanatory diagram showing a relation between a difference from an optimum value (ideal value) of a width of the detecting electrode shown in FIGS. 4 and 5 and a position detection accuracy.

As described above, when the width WX, the interval SP, and the effective inter-electrode distance between the detecting electrode Rx and the driving electrode Tx satisfy the relation of the Formula 1 above, an input position detection accuracy of the input device TP becomes the highest. However, when the respective values of the actual product are measured, the relation is deviated from the coordinate plane Smax shown in FIG. 6 in some cases due to the problem in processing accuracy or a restriction of other design conditions and the like. Thus, the inventors of the present application have studied an allowable deviation amount from the coordinate plane Smax from a viewpoint that a position detection error is reduced to not more than ±2.0 mm. Hereinafter, with taking the width WX of the detecting electrode Rx shown in FIGS. 4 and 5 for example, an allowable error with respect to the Wsmax shown in the Formula 1 will be described. FIG. 7 is an explanatory diagram showing a relation between a difference from an optimum value (ideal value) of the width of the detecting electrode shown in FIGS. 4 and 5 and a position detection accuracy.

Evaluation results in FIG. 7 are the results of experiment for the correlation between the deviation (WX-Wsmax) from an ideal value of the width WX and the detection accuracy obtained while changing the width WX of the detecting electrode Rx shown in FIGS. 4 and 5. Note that, in the evaluation shown in FIG. 7, two types of input devices each having different interval P and effective inter-electrode distance D are prepared, and the evaluation is carried out for each of them while changing the width WX of the detecting electrode Rx. As an evaluation index, a position detection error (Accuracy error) of an input position is used. In FIG. 7, the position detection error is indicated simply as a detection error. Also, in a column of evaluation, "○" is given when the detection error is not more than ±1.5 mm, "Δ" is given when the detection error is ±1.5 mm to ±2.0 mm, and "×" is given when the detection error is more than ±2.0 mm.

From the evaluation results shown in FIG. 7, it has turned out that the detection error can be reduced to not more than 2.0 mm when an absolute value of the deviation (WX-Wsmax) from the ideal value of the width WX is within the range of not more than 150 μm. In other words, by making the width WX of each of the plurality of detecting electrodes Rx in an X direction shown in FIG. 4 fall within a range of not more than ±150 μm of the value of Wsmax, the input position detection sensitivity and the resolution of various types of input devices can be enhanced. It has also turned out that it is preferred in particular to make the width WX fall within a range of not more than ±100 μm of the value of Wsmax from a viewpoint of reducing the detection error to not more than ±2.0 mm more surely.

<Modification Example of Input Device>

Figure 8:
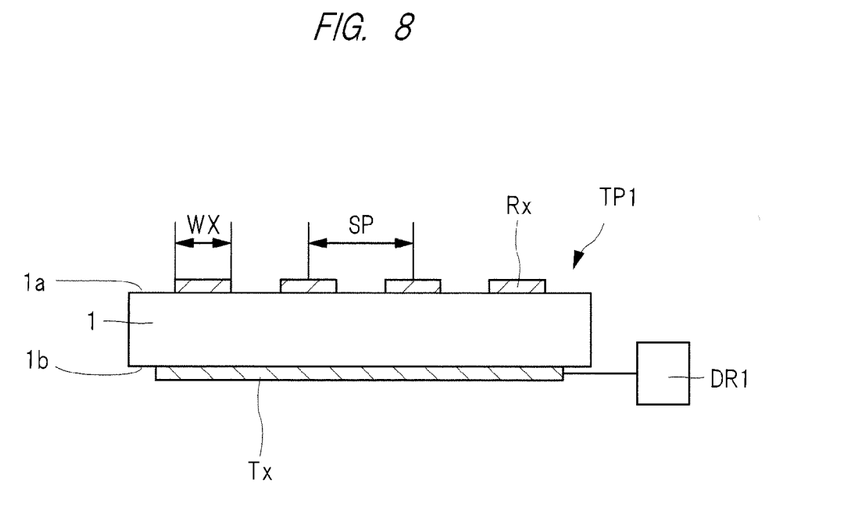
FIG. 8 is a cross-sectional view showing an input device of a modification example with respect to FIG. 5.
Figure 9:
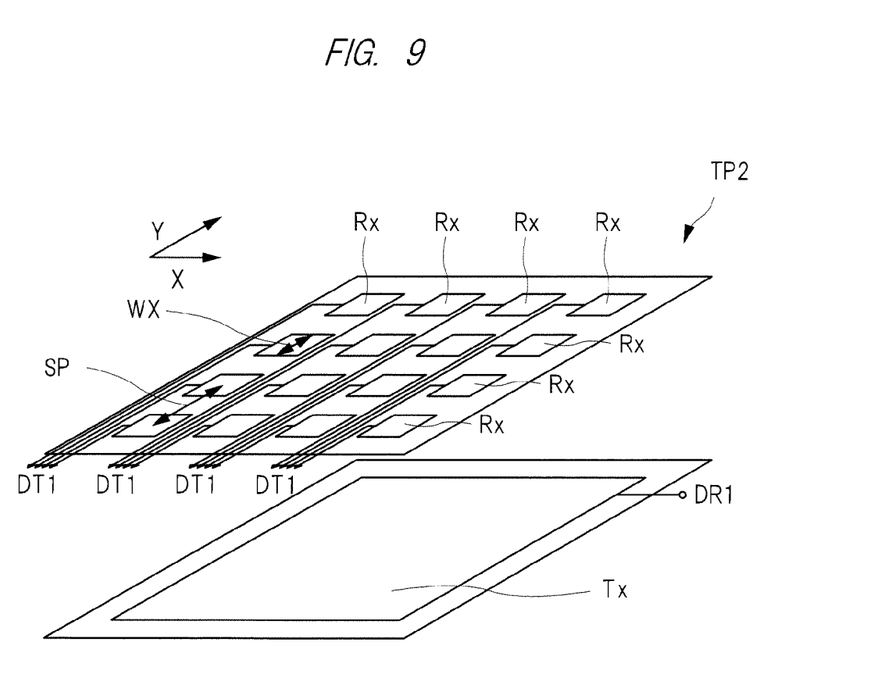
FIG. 9 is an explanatory diagram showing an input device of a modification example with respect to the electrode layout shown in FIG. 4.

In FIGS. 1 to 7, the input device TP having a simple structure has been described for easy understanding, and since it is possible to function as an input device if an intermediate member is just provided between the detecting electrode Rx and the driving electrode Tx provided separately, the input device can be applied to various kinds of modification examples as shown in FIGS. 8 and 9. FIG. 8 is a cross-sectional view showing an input device of a modification example with respect to FIG. 5. FIG. 9 is an explanatory diagram showing an input device of a modification example with respect to the electrode layout shown in FIG. 4.

In an input device TP1 shown in FIG. 8, a plurality of detecting electrodes Rx are formed on a front surface 1a of a substrate 1 that is a dielectric substance such as a glass substrate, and a driving electrode Tx which forms a capacitive element with the detecting electrodes Rx is formed on a back surface 1b located on an opposite side of the front surface 1a. More specifically, an intermediate member disposed between the detecting electrode Rx and the driving electrode Tx is not limited to that having a plurality of layers, and the technology mentioned above is applicable even if the intermediate member has a single-layer structure. Also, although the detecting electrodes Rx are exposed in the input device TP shown in FIG. 5 and in the input device TP1 shown in FIG. 8, the present embodiment is not limited to the structure in which the detecting electrodes Rx are exposed. Though not shown, it is possible to dispose a substrate (covering member) such as a glass substrate or the like other than the substrate 1 on the front surface 1a side of the substrate 1 so as to cover the plurality of detecting electrodes Rx shown in FIG. 5. In this case, it is possible to protect the detecting electrodes Rx from damages.

Also, in an input device TP2 shown in FIG. 9, the driving electrode Tx is formed as a solid pattern, and the detecting electrodes Rx are arranged in a matrix form (matrix shape). In this case, when the width WX and interval SP are defined with respect to a direction (Y direction in FIG. 9) in which one side of the detecting electrode Rx having a square shape extends, the application in the same manner as the formula 1 described with reference to FIG. 4 is possible.

Second Embodiment

In the above-mentioned first embodiment, the structure of the input devices TP, TP1 and TP2 has been described, and since input command is given based on a display image in an input device called a touch panel, the input device and the display device are used in combination. In the present embodiment, an embodiment in which the technology described in the above-mentioned first embodiment is applied to a display device with an input device in which the input device and the display device are combined will be described. Also, in the following description of the embodiment, a liquid crystal display which uses a liquid crystal layer as a display function layer on which a display image is formed by applying a display voltage between display electrodes is taken as an example of the display device.

<Basic Configuration of Display Device>

Figure 10:
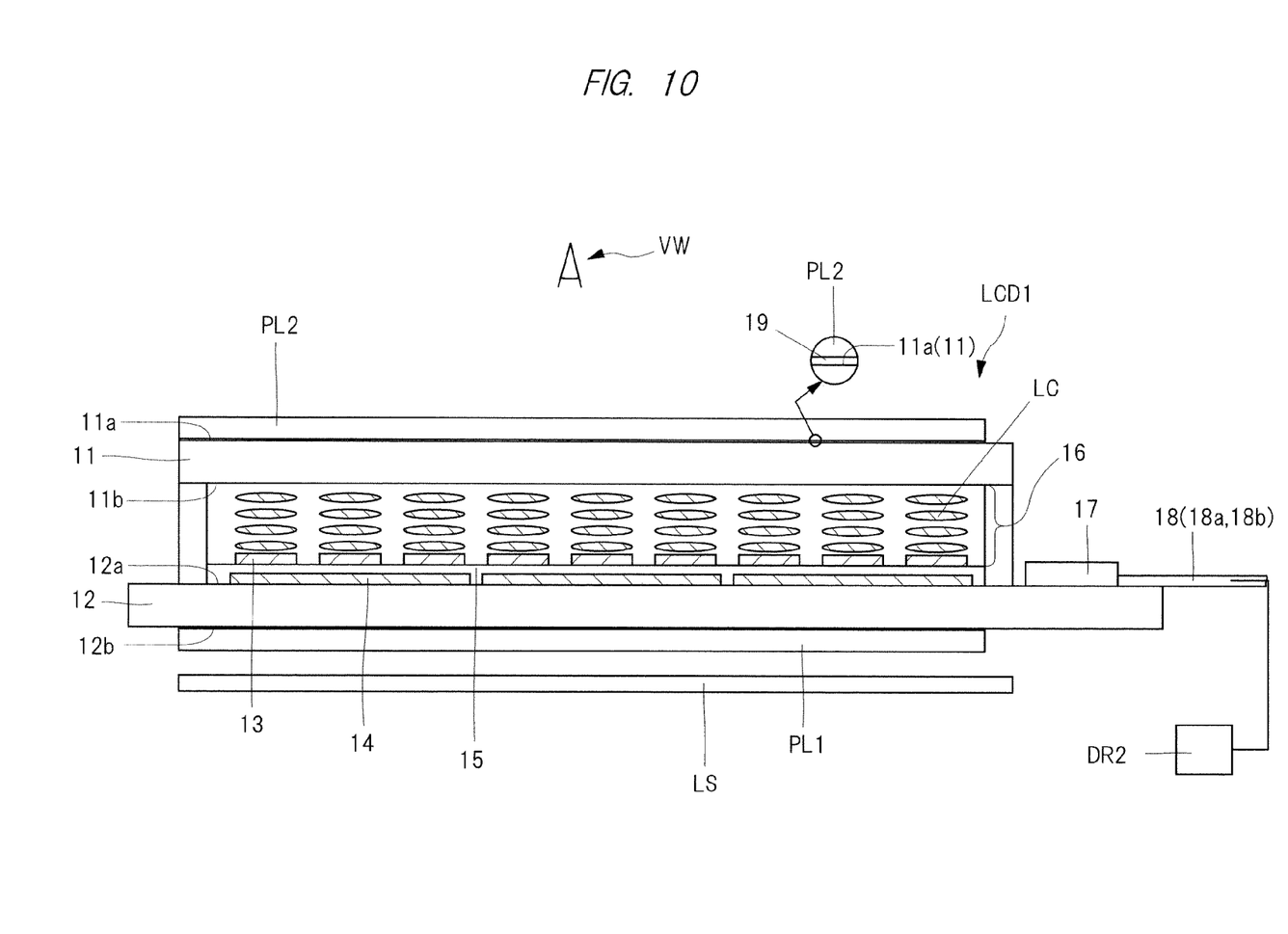
FIG. 10 is a cross-sectional view showing the principal part of a basic configuration of an example of a liquid crystal display.

Next, a basic configuration of the display device will be described. FIG. 10 is a cross-sectional view showing the principal part of a basic configuration of an example of a liquid crystal display. Note that, in FIG. 10, hatching to a liquid crystal layer 16 is omitted for making the drawing easy to see, and a liquid crystal LC constituting the liquid crystal layer 16 is schematically shown as an elliptical shape.

The liquid crystal display is roughly classified into the following two kinds in accordance with an applying direction of an electric field for changing an orientation of liquid crystal molecules of a liquid crystal layer serving as a display function layer. That is, the first classification is a so-called longitudinal electric field mode in which an electric field is applied in a thickness direction (out-of-plane direction) of a liquid crystal display. The longitudinal electric field mode includes, for example, a TN (twisted Nematic) mode and a VA (Vertical Alignment) mode. Also, the second classification is a so-called transverse electric field mode in which an electric field is applied in a plane direction (in-plane direction) of a liquid crystal display. The transverse electric field mode includes, for example, an IPS (In-Plane Switching) mode and an FFS (Fringe Field Switching) mode. The technology described below is applicable to any of the longitudinal electric field mode and transverse electric field mode, and the display device of the transverse electric field mode (FFS mode in detail) is shown as an example in FIG. 10.

A display device LCD1 shown in FIG. 10 is provided with a substrate 11 having a front surface (side) 11a disposed on a display surface side (viewer VW side) and a substrate 12 disposed on an opposite side of the front surface 11a of the substrate 11 so as to separate from the substrate 11. Also, the display device LCD1 is further provided with a plurality of pixel electrodes 13 arranged between the substrate 11 and the substrate 12 and common electrodes 14 arranged between the substrate 11 and the substrate 12. In addition, the display device LCD 1 is further provided with the liquid crystal layer 16 which is disposed between the substrate 11 and the substrate 12 and serves as a display function layer on which a display image is formed by applying a display voltage between the plurality of pixel electrodes 13 and the plurality of common electrodes 14.

The substrate 11 is a color filter substrate in which a color filter (not shown) which forms an image of a color display is formed, and has the front surface 11a that is the display surface side and a back surface (side, rear surface, inner surface) 11b located on the opposite side of the front surface 11a. To the substrate 11, a color filter in which color filter layers having three colors of red (R), green (G) and blue (B) are arranged periodically on one surface of a base material such as a glass substrate is attached. In a color display device, for example, one pixel is made from one set of the sub pixels of three colors of red (R), green (G) and blue (B).

Also, the substrate (array substrate) 12 is a circuit board on which circuits for image-displaying are mainly formed, and has a front surface (side, inner surface) 12a located on the substrate 11 side and a back surface (side, rear surface) 12b located on the opposite side thereof. On the front surface 12a side of the substrate 12, active elements such as a TFT (Thin-Film Transistor) and a plurality of pixel electrodes 13 are formed in a matrix form (array form). Also, since an example shown in FIG. 10 represents the display device LCD1 of the transverse electric field mode (FFS mode in detail) as mentioned above, the common electrodes 14 are also formed on the front surface 12a side of the substrate 12. The common electrode 14 is formed on the front surface 12a of the substrate 12, and an insulating layer 15 is stacked on the common electrode 14. In addition, the plurality of pixel electrodes 13 are formed on the insulating layer 15 so as to be opposed to the common electrodes 14 via the insulating layer 15. In the display device LCD1, a pixel voltage and a common driving signal are applied to the pixel electrode 13 and the common electrode 14, respectively, in a display period, thereby determining the display voltage of each pixel.

Also, though not shown, other than those mentioned above, a display driver for driving the pixel electrodes 13 and wirings such as a source line for supplying a pixel signal to the pixel electrodes 13 and a gate line for driving the TFTs are formed on the substrate 12.

Further, between the substrate 11 and the substrates 12, the liquid crystal layer 16 that is a display function layer on which a display image is formed by applying a display voltage between the pixel electrodes 13 and the common electrodes 14 is provided. The liquid crystal layer 16 modulates light which passes therethrough in accordance with a status of the applied electric field, and a liquid crystal LC corresponding to various modes such as the TN, the VA, and the FFS is used for the liquid crystal layer 16. Note that, though not shown, an alignment film is formed each between the liquid crystal layer 16 and the substrate 11 and between the liquid crystal layer 16 and the substrate 12.

In addition, on the back surface 12b side of the substrate 12 of display device LCD1, a light source LS and a polarization plate PL1 which filters the light emitted from the light source LS are provided. On the other hand, on the front surface 11a side of the substrate 11, a polarization plate PL2 which filters the light which has passed through the substrate 11 is provided.

Also, in the example shown in FIG. 10, a semiconductor chip (driver tip) 17 in which a drive circuit which supplies a drive potential to the pixel electrodes 13 is formed and a wiring board 18 electrically connected to a drive circuit DR2 for image-displaying are electrically connected to the front surface 12a of the substrate 12. The wiring board 18 is a so-called flexible circuit board which has a plurality of wirings formed in a resin film and can be freely transformed in accordance with the shape of an arrangement place. The wirings formed in the wiring board 18 include a wiring 18a electrically connected to the pixel electrodes 13 and a wiring 18b electrically connected to the common electrodes 14. Note that, in the example shown in FIG. 10, an embodiment of a so-called COG (Chip on glass) method in which a semiconductor chip is mounted on the substrate 12 is shown, but a place where a semiconductor chip is mounted is not limited to that on the substrate 12, and the method in which the semiconductor chip is mounted on the wiring board 18 is also applicable.

A display method of a color image by the display device LCD1 shown in FIG. 10 is as follows. That is, the light emitted from the light source LS is filtered by the polarization plate PL1, and the light (polarized light) having an amplitude which transmits through the polarization plate PL1 enters the liquid crystal layer 16. The light which has entered the liquid crystal layer 16 is propagated in a thickness direction of the liquid crystal layer 16 (direction toward the substrate 11 from the substrate 12), while changing a polarization state in accordance with refractive index anisotropy (birefringence) of the liquid crystal LC, and is then emitted from the substrate 11. At this time, a liquid crystal orientation is controlled by the electric field formed by applying a voltage to the pixel electrode 13 and common electrode 14, and the liquid crystal layer 16 functions as an optical shutter. More specifically, in the liquid crystal layer 16, it is possible to control the transmittance of light for each sub pixel. To the light which has reached the substrate 11, the color filtering process (process of absorbing light having a wavelength other than a prescribed value) is applied in the color filter formed in the substrate 11, and the light is then emitted from the front surface 11a. Also, the light emitted from the front surface 11a is filtered by the polarization plate PL2, and reaches the viewer VW.

<Configuration of Display Device with Input Device>

Figure 11:
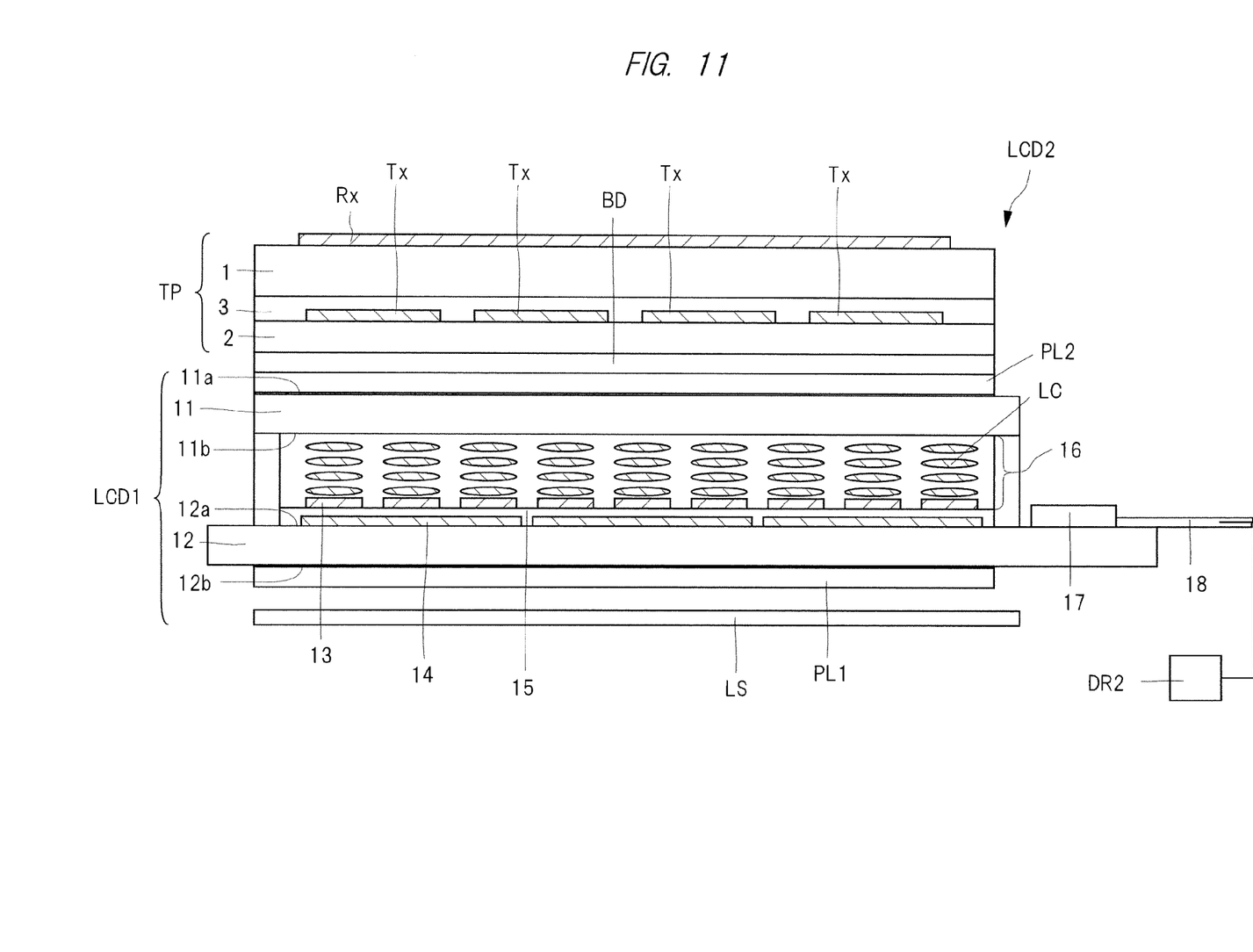
FIG. 11 is a cross-sectional view showing the principal part of a configuration example of a display device with an input device in which the input device shown in FIG. 4 and the display device shown in FIG. 10 are combined.
Figure 12:
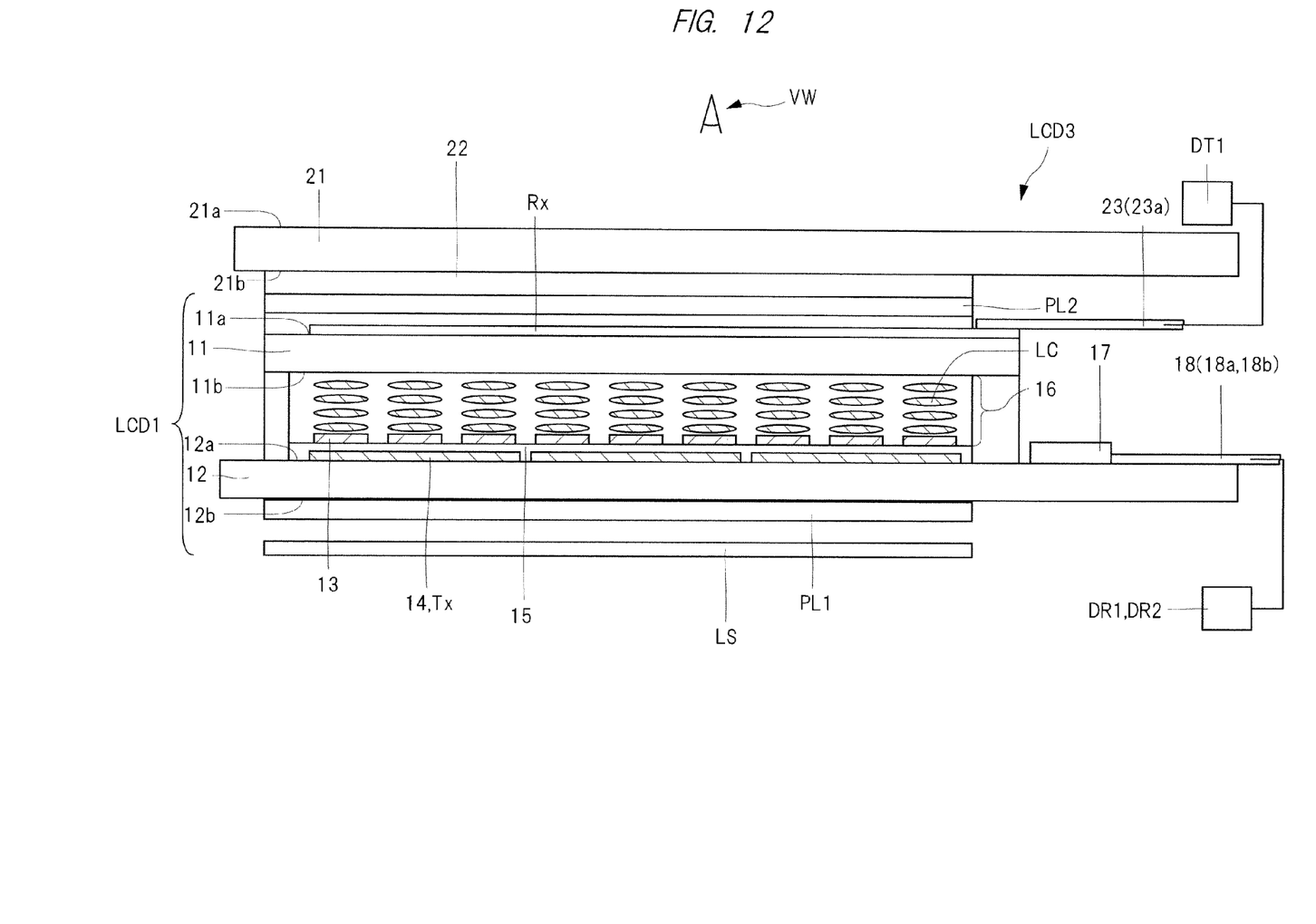
FIG. 12 is a cross-sectional view showing the principal part of a basic configuration of an example of a display device with an input device which is a modification example with respect to FIG. 11.

Next, a configuration of a display device with an input device in which functions of the above-mentioned input device and functions of the display device are combined will be described. FIG. 11 is a cross-sectional view showing the principal part of a configuration example of a display device with an input device in which the input device shown in FIG. 4 and the display device shown in FIG. 10 are combined. Also, FIG. 12 is a cross-sectional view showing the principal part of a basic configuration of an example of a display device with an input device which is a modification example with respect to FIG. 11. Note that, since FIGS. 11 and 12 correspond to the cross section taken along a Y direction shown in FIG. 4, the detecting electrode Rx is shown as one long conductor pattern.

As a display device with an input device having a simple structure, an embodiment in which the input device TP is disposed on the polarization plate PL2 of the display device LCD1 like a display device LCD2 with an input device shown in FIG. 11 is applicable. In the display device LCD2 with an input device, the polarization plate PL2 on the substrate 11 side of the display device LCD1 and the substrate 2 of the input device TP are disposed to be opposed to each other and are adhered to be fixed via an adhesion layer BD. The technology described in the above-mentioned first embodiment is applicable also to the display device LCD2 with an input device, but it is particularly effective when applied to a display device with an input device in which a large number of members are stacked between the detecting electrode Rx and the driving electrode Tx like the display device LCD3 with an input device shown in FIG. 12.

In the display device LCD3 with an input device shown in FIG. 12, the detecting electrode (input-position detecting electrode) Rx is formed on the substrate 11 side of the display device LCD1 described with reference to FIG. 10, and no driving electrode Tx is formed. A wiring board 23 is connected to the detecting electrode Rx, and the detecting electrode Rx is electrically connected via the wiring board 23 to the detection circuit DT1 which detects an input position. The wiring board 23 is a so-called flexible circuit board which has a plurality of wirings formed in a resin film and can be freely transformed in accordance with the shape of an arrangement place. The wirings formed in the wiring board 23 include wirings 23a which are electrically connected to the plurality of detecting electrodes Rx and transmit a detection signal to the detection circuit DT1.

In the display device LCD3 with an input device, as shown in FIG. 12, the driving waveform DW for input position detection described with reference to FIG. 2 is applied to the common electrode 14 of the display device LCD1. The driving waveform DW (see FIG. 2) can be applied to the common electrode 14 via the wiring board 18. The common electrode 14 is electrically connected to the drive circuit DR1 via the wiring board 18.

As mentioned above, when the configuration in which the driving waveform DW for input position detection is applied to the common electrode 14 is represented in another expression, the common electrode 14 has both of a function as the common electrode 14 for display device LCD1 and a function as the driving electrode Tx of the input device in the display device LCD3 with an input device. A method of using the common electrode 14 also as the driving electrode Tx in common can be realized by, for example, dividing a certain period (one period) into a touch detection period (input period) and a display writing period. In this way, by using the common electrode 14 for the display device LCD1 and the driving electrode Tx of the input device in common, it is possible to reduce the whole thickness of the display device LCD3 with an input device.

In the display device LCD3 with an input device, the detecting electrode Rx is formed between the polarization plate PL2 on the display surface side and the substrate 11 having the color filter formed therein. In other words, in the display device LCD3 with an input device, the detecting electrode Rx and the driving electrode Tx as an input device are formed between the polarization plates PL1 and PL2 disposed to be opposed to each other, that is, inside the display device LCD1. By forming the detecting electrode Rx and the driving electrode Tx as an input device inside the display device in this manner, the thickness of the display device with an input device can be reduced to the maximum extent.

In FIG. 12, as an example of an embodiment in which the common electrode 14 for the display device LCD1 and the driving electrode Tx of the input device are used in common, the display device LCD3 with an input device in which the detecting electrode Rx is formed between the polarization plate PL2 on the display surface side and the substrate 11 having the color filter formed therein is shown. However, various kinds of modification examples can be applied to the formation position of the detecting electrode Rx as long as the detecting electrode Rx is arranged on the opposite side of the substrate 12 with interposing the substrate 11 therebetween. For example, a substrate 21 shown in FIG. 12 is a cover plate which has a back surface 21b opposed to the front surface 11a of the substrate 11 and a front surface 21a located on the opposite side of the back surface 21b. As a modification example with respect to FIG. 12, the detecting electrode Rx can be formed at least on either one surface of the front surface 21a and the back surface 21b of this substrate 21. Alternatively, a substrate (not shown) having the detecting electrode Rx formed on at least one surface can be added between the substrate 21 and the substrate 11.

When the common electrode 14 for the display device LCD1 and the driving electrode Tx of the input device are used in common like in the display device LCD3 with an input device, it becomes difficult to optimize an electrode width of the detecting electrode Rx, an arrangement interval and a value of the effective inter-electrode distance between the detecting electrode Rx and the driving electrode Tx because many intermediate members are disposed between the detecting electrode Rx and the driving electrode Tx. However, by applying the Formula 3 described in the above-mentioned first embodiment, the effective inter-electrode distance D between the detecting electrode Rx and the driving electrode Tx can be easily calculated. More specifically, in the case of the display device LCD3 with an input device shown in FIG. 12, a value of the effective inter-electrode distance D can be easily calculated by substituting the thickness and relative permittivity of each of the substrate 11, the liquid crystal layer 16, the pixel electrode 13 and the insulating layer 15 into the Formula 3. Also, by substituting the calculated value of the effective inter-electrode distance D into the Formula 1, an equation with one unknown of the Wsmax and the interval P can be acquired. In other words, if either one of the interval SP and the width WX described with reference to FIG. 4 is determined, the optimum value (ideal value) of the other can be easily calculated. Also, as described in the above-mentioned first embodiment, by making the width WX of each of the plurality of detecting electrodes Rx in an X direction shown in FIG. 4 fall within a range of not more than ±150 µm of a value of the Wsmax, an input position detection sensitivity and a resolution of various types of input devices can be respectively enhanced. In addition, from a viewpoint of reducing a detection error to not more than ±2.0 mm more surely, it is preferred to make the width WX fall within a range of not more than ±100 µm of the value of the Wsmax.

Other Modification Example

In the foregoing, the invention made by the inventors of the present invention has been concretely described based on the embodiments. However, it is needless to say that the present invention is not limited to the foregoing embodiments and various modifications and alterations can be made within the scope of the present invention.

For example, in the above-mentioned embodiment, a formula for calculating the Wsmax which is the optimal width of the detecting electrode Rx is expressed as the Formula 1. Alternatively, a formula for calculating another variable (effective inter-electrode distance D or interval P) can be obtained by setting the line width of the detecting electrode Rx as a constant.

Furthermore, it is also possible to apply the technologies described in the above-mentioned first embodiment and second embodiment to display devices such as an organic EL (Electro-Luminescence) display other than a liquid crystal display.

The present invention can be widely applied to a display device with an input device and an electronic device in which the display device with an input device is incorporated.

It should be understood that various changes and modifications to the presently preferred embodiments described herein will be apparent to those skilled in the art. Such changes and modifications can be made without departing from the spirit and scope of the present subject matter and without diminishing its intended advantages. It is therefore intended that such changes and modifications be covered by the appended claims.

The invention is claimed as follows:

1. An input device comprising:
a plurality of input-position detecting electrodes arranged at a first interval along a first direction of a display plane;
at least one driving electrode which is arranged so as to be opposed to the plurality of input-position detecting electrodes and forms an electrostatic capacitance with the plurality of input-position detecting electrodes; and
an intermediate member disposed between the plurality of input-position detecting electrodes and the at least one driving electrode,
wherein when an ideal value of a width of each of the plurality of input-position detecting electrodes in the first direction is defined as Wsmax [µm], the first interval which is a center-to-center distance of adjacent input-position detecting electrodes among the plurality of input-position detecting electrodes is defined as P [µm], and an effective inter-electrode distance represented by an inverse number of a value obtained by dividing a relative permittivity of the intermediate member by a thickness of the intermediate member is defined as D [µm], Wsmax is represented by a following formula:

$$Wsmax = 0.488 \times P - 4.33 \times D - 160, \text{ and}$$

the width of each of the plurality of input-position detecting electrodes in the first direction falls within a range of not more than ±150 µm of a value of the Wsmax.

2. The input device according to claim 1,
wherein a plurality of the intermediate members each having different relative permittivities are provided between the plurality of input-position detecting electrodes and the at least one driving electrode, and
D [µm] which is the effective inter-electrode distance is represented as an inverse number of a sum of values obtained by dividing relative permittivities of the plurality of intermediate members each having different relative permittivities by thicknesses thereof.

3. A display device with an input device comprising:
a display device which includes: a first substrate having a first surface; a second substrate which has a second surface opposed to the first substrate and is disposed on an opposite side to the first surface of the first substrate so as to be separated from the first substrate; a plurality of pixel electrodes arranged between the first substrate and the second substrate; at least one common electrode arranged between the first substrate and the second substrate; and a display function layer which is disposed between the first substrate and the second substrate and on which a display image is formed by applying a display voltage between the plurality of pixel electrodes and the at least one common electrode; and
an input device which is fixed to a first surface side of the first substrate, wherein the input device includes a third substrate having a third surface and a fourth substrate which is opposed to the third substrate and disposed on a display device side compared with the third substrate, the input device further includes:

a plurality of input-position detecting electrodes arranged at a first interval along a first direction of the third surface;

at least one driving electrode which is arranged so as to be opposed to the plurality of input-position detecting electrodes with interposing the third substrate therebetween and forms an electrostatic capacitance with the plurality of input-position detecting electrodes; and an intermediate member disposed between the plurality of input-position detecting electrodes and the at least one driving electrode, when an ideal value of a width of each of the plurality of input-position detecting electrodes in the first direction is defined as Wsmax [μm], the first interval which is a center-to-center distance of adjacent input-position detecting electrodes among the plurality of input-position detecting electrodes is defined as P [μm], and an effective inter-electrode distance represented by an inverse number of a value obtained by dividing a relative permittivity of the intermediate member by a thickness of the intermediate member is defined as D [μm], Wsmax is represented by a following formula:

$$Wsmax=0.488 \times P - 4.33 \times D - 160, \text{ and}$$

the width of each of the plurality of input-position detecting electrodes in the first direction falls within a range of not more than ±150 μm of a value of the Wsmax.

4. A display device with an input device comprising:

a display device which includes: a first substrate having a first surface; a second substrate which has a second surface opposed to the first substrate and is disposed on an opposite side to the first surface of the first substrate so as to be separated from the first substrate; a plurality of pixel electrodes arranged between the first substrate and the second substrate; at least one common electrode arranged between the first substrate and the second substrate; and a display function layer which is disposed between the first substrate and the second substrate and on which a display image is formed by applying a display voltage between the plurality of pixel electrodes and the at least one common electrode; and a plurality of input-position detecting electrodes which are formed on an opposite side of the second substrate with interposing the first substrate therebetween and form an electrostatic capacitance with the at least one common electrode of the display device, thereby detecting an input position, wherein the plurality of input-position detecting electrodes are arranged at a first interval along a first direction of the first surface, when an ideal value of a width of each of the plurality of input-position detecting electrodes in the first direction is defined as Wsmax [μm], the first interval which is a center-to-center distance of adjacent input-position detecting electrodes among the plurality of input-position detecting electrodes is defined as P [μm], and an effective inter-electrode distance represented by an inverse number of a value obtained by dividing a relative permittivity of an intermediate member disposed between the plurality of input-position detecting electrodes and the at least one common electrode by a thickness of the intermediate member is defined as D [μm], Wsmax is represented by a following formula:

$$Wsmax=0.488 \times P - 4.33 \times D - 160, \text{ and}$$

the width of each of the plurality of input-position detecting electrodes in the first direction falls within a range of not more than ±150 μm of a value of the Wsmax.

5. A display device with an input device comprising:

a display device which includes: a first substrate having a first surface; a second substrate which has a second surface opposed to the first substrate and is disposed on an opposite side to the first surface of the first substrate so as to be separated from the first substrate; a plurality of pixel electrodes arranged between the first substrate and the second substrate; at least one common electrode arranged between the first substrate and the second substrate; and a display function layer which is disposed between the first substrate and the second substrate and on which a display image is formed by applying a display voltage between the plurality of pixel electrodes and the at least one common electrode;

a plurality of input-position detecting electrodes which are formed on an opposite side of the second substrate with interposing the first substrate therebetween and form an electrostatic capacitance with the at least one common electrode of the display device, thereby detecting an input position; and a third substrate disposed so as to be opposed to the first surface, wherein the plurality of input-position detecting electrodes are arranged on at least one surface of the third substrate at a first interval along a first direction, when an ideal value of a width of each of the plurality of input-position detecting electrodes in the first direction is defined as Wsmax [μm], the first interval which is a center-to-center distance of adjacent input-position detecting electrodes among the plurality of input-position detecting electrodes is defined as P [μm], and an effective inter-electrode distance represented by an inverse number of a value obtained by dividing a relative permittivity of an intermediate member disposed between the plurality of input-position detecting electrodes and the at least one common electrode by a thickness of the intermediate member is defined as D [μm], Wsmax is represented by a following formula:

$$Wsmax=0.488 \times P - 4.33 \times D - 160, \text{ and}$$

the width of each of the plurality of input-position detecting electrodes in the first direction falls within a range of not more than ±150 μm of a value of the Wsmax.

* * * * *